(12) United States Patent
Bose et al.

(10) Patent No.: US 9,916,770 B2
(45) Date of Patent: Mar. 13, 2018

(54) METHODS AND SYSTEMS FOR TACTILE CODE INTERPRETATION

(71) Applicant: TATA CONSULTANCY SERVICES LIMITED, Mumbai (IN)

(72) Inventors: Sneha Bose, Bangalore (IN); Shalin Garg, Bangalore (IN); Annie Thomas, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 565 days.

(21) Appl. No.: 14/542,182

(22) Filed: Nov. 14, 2014

(65) Prior Publication Data
US 2015/0140522 A1 May 21, 2015

(30) Foreign Application Priority Data

Nov. 18, 2013 (IN) .......................... 3603/MUM/2013

(51) Int. Cl.
*G09B 21/00* (2006.01)
*G06F 3/16* (2006.01)

(52) U.S. Cl.
CPC ........... *G09B 21/007* (2013.01); *G06F 3/167* (2013.01)

(58) Field of Classification Search
CPC .................................................... G09B 21/007
USPC ........................................................ 434/113
See application file for complete search history.

(56) References Cited

U.S. PATENT DOCUMENTS

| | | | |
|---|---|---|---|
| 4,880,384 A | 11/1989 | Murphy | |
| 5,275,567 A | 1/1994 | Whitfield | |
| 6,059,575 A * | 5/2000 | Murphy | G09B 21/003 400/483 |
| 6,162,059 A * | 12/2000 | Murphy | G09B 21/003 273/153 S |
| 6,357,940 B1 * | 3/2002 | Murphy | G09B 21/003 341/23 |
| 6,726,485 B2 * | 4/2004 | Marcus | G09B 1/06 434/156 |

(Continued)

OTHER PUBLICATIONS

"Acoustic barcodes respond to a scratch," Authored by: TechNewsDaily for MNN—Mother Nature Network, URL = www.mnn.com/money/sustainable-business-practices/stories/acoustic-barcodes-respond-to-a-scratch#, retrieved Apr. 10, 2013, 2 pages.

(Continued)

*Primary Examiner* — Sam Yao
*Assistant Examiner* — Alvin Carlos
(74) *Attorney, Agent, or Firm* — Seed IP Law Group LLP

(57) ABSTRACT

Methods and systems (100) for tactile code interpretation are described herein. In an embodiment, a tactile code interpretation system (100) includes a tactile code device (102) having a plurality of tactile units (106). Each of the plurality of tactile units (106) includes a tactile code (108) for representing a notation and a corresponding acoustic code (110). The acoustic code (110) encodes information pertaining to a plurality of data blocks. The plurality of data bocks includes a start block corresponding to a start pattern, an end block corresponding to an end pattern, and one or more information blocks corresponding to information pertaining to the tactile code (108). Further, the acoustic code (110), when swiped, generates a unique sound wave to facilitate semantic interpretation of the corresponding tactile code (108).

14 Claims, 10 Drawing Sheets

(56) References Cited

U.S. PATENT DOCUMENTS

| | | | |
|---|---|---|---|
| 2002/0126104 A1* | 9/2002 | Knowles | G06F 3/0436 |
| | | | 345/177 |
| 2010/0315211 A1* | 12/2010 | Le-Faucheur | G06F 1/1613 |
| | | | 340/407.1 |
| 2014/0337634 A1* | 11/2014 | Starner | H04L 9/3231 |
| | | | 713/186 |

OTHER PUBLICATIONS

Harrison et al., "Acoustic Barcodes: Passive, Durable and Inexpensive Notched Identification Tags," UIST '12, Oct. 7-10, 2012, Cambridge, Massachussetts, 5 pages.

Rubio, J., "Acoustic Barcodes can use sound waves to create a binary ID on most surfaces," URL=http://www.theverge.com/2012/10/13/3497598/acoustic-barcodes-sound-waves-binary-id, retrieved Nov. 7, 2014, 2 pages.

England, J., "Acoustic Barcodes Store Data In Sound Waves," URL=http://newrisingmedia.com/all/2012/10/13/acoustic-barcodes-store-data-in-sound-waves.html, retrieved Nov. 7, 2014, 2 pages.

* cited by examiner

METHODS AND SYSTEMS FOR TACTILE CODE INTERPRETATION

TECHNICAL FIELD

The present subject matter relates, in general, to writing systems and, in particular, to methods and systems for tactile code interpretation.

BACKGROUND

Generally, in order to assist visually challenged individuals in learning various languages and performing day to day activities, tactile alphabet or tactile codes are used. Tactile codes, such as Braille codes, shorthand, and Moon code, constitute a writing system that the blind or visually challenged can read by touch. The tactile codes typically include raised surfaces so that the visually challenged may touch and feel the codes to understand or to read the underlying matter. For example, Braille is commonly used in books, currency notes, and elevator buttons for use by the visually challenged.

In order to be able to use the tactile codes effectively, the visually challenged individuals may learn the tactile writing systems. The tactile code knowledge may help in making the visually challenged individuals independent and provide for further development of the visually challenged individuals, for example, taking up jobs in companies and institutes. The tactile code learning process generally includes an instructor assisting one or more visually challenged individuals to help them learn various notations and thus the language, symbols, and other disciplines, such as music, mathematics and science.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
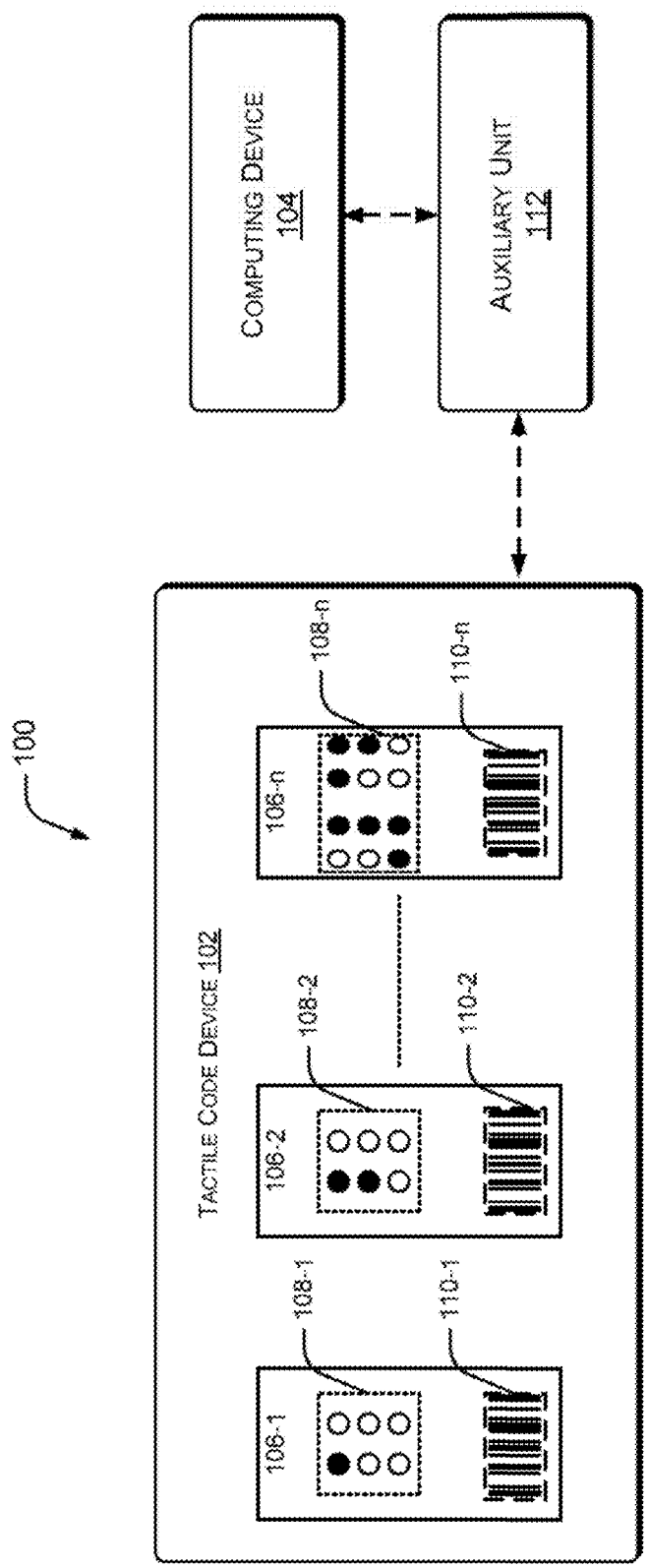
FIG. 1A illustrates a tactile code interpretation system, in accordance with an embodiment of the present subject matter.

Method(s) and system(s) for interpretation of tactile codes are described herein. Example of tactile codes include, but are not limited to, Braille characters, Blissymbolics, shorthand, Moon, Graffiti, Nemeth code, Solresol, and Sutton Sign writing.

Tactile codes may be understood as a writing system for visually challenged individuals. The tactile codes represent each constituent notation in a specific way to distinguish one notation from another. For instance, in Braille the number and arrangement of the raised dots distinguishes one notation from another. Visually challenged individuals can touch the raised surfaces representing the notation and interpret the notation represented by the corresponding tactile code. In conventional methods, an instructor assists a visually challenged individual in introducing and learning the notations represented by various tactile codes, for various languages, scripts, symbols and other disciplines, such as music, mathematics and science. However, assisted learning is often based on availability of skilled instructors, who may be available in limited numbers compared to the demand in enrollment.

Further, assisted learning is a cost intensive approach for tactile learning as the instructors may need to take multiple sessions for the individuals to familiarize them with the tactile codes. Also, traditional devices that may be used for teaching tactile writing systems are generally bulky and expensive. Consequently, owing to limited number of skilled instructors and cost intensive nature of traditional techniques for learning tactile writing systems, the visually challenged individuals may not be empowered to learn the tactile writing systems. Further, the visually challenged individuals may not be inclined to learn the tactile writing systems due to introduction of screen readers, such as Braille screen readers, which in turn results in a decline in tactile writing system literacy and high dropout rates.

Moreover, assisted learning, where a single instructor assists a group of individuals, may not be an efficient or effective mode of teaching, as various individuals may have varying aptitude. Accordingly, some individuals may learn faster than others, while there may be few who may take longer time for the same topic. Thus, the visually challenged individuals may not be able to learn at their own pace, as different individuals have varied pace of learning. Further, the visually challenged individuals are at a disadvantage with their sighted peers, owing to unavailability of such devices, which provide for social networking and gaming related capabilities, for mutual knowledge sharing and recreational activities.

According to an embodiment of the present subject matter, systems and methods for tactile code interpretation are described herein. For the purposes of explanation, tactile codes of the present subject matter correspond to any notation that can be touched and interpreted by a visually challenged individual. These written symbols and notations may be represented by way of tactile codes. For example, the notations may correspond to a language, musical notations, characters used for currency denominations, and other notations, such as navigation signs or keys used for gaming or other social interactions.

In an implementation, a tactile code device may be provided to be used along with a computing device. The tactile code device may include a plurality of tactile units, which may be provided on a base, for example, a frame or a mounting structure. The base may be composed of, for instance, plastic, glass, wood, metal, polymer, or fiber. The tactile units may be fixedly attached, removably attached, or movably coupled to the base. Each of the tactile units includes markings corresponding to a tactile code representing a notation and an acoustic code. The acoustic code may include markings that may be etched or grooved on the tactile unit so as to produce an acoustic signal or a sound when swiped with, for example, fingernail or swiping unit. The markings may collectively form a unique code and since the code is provided for further analysis by way of an acoustic signal, these markings may be referred to as an acoustic code. Further, the markings encode the information pertaining to the tactile code. Typically, when an acoustic code is swiped, a unique acoustic wave, hereinafter referred to as sound wave, is generated.

Further, in an example, the generated acoustic wave, or sound wave, need not be in audible range of 20 Hz-20 KHz and may be inaudible. For instance, sound wave may comprise ultrasonic waves or supersonic waves. Additionally, a transducer for capturing the sound waves is configured to pick the sound waves, which may not be in the audible frequency range. The generated sound wave may be processed further, as explained later, to obtain a corresponding binary data stream. Further, the binary data stream can be grouped into a plurality of data blocks. The data blocks include, for example, a start block, an end block, and one or more information blocks. The one or more information blocks include, for example, a discipline block, a classification block, and one or more data payload blocks.

In order to determine a notation represented by the tactile code, a user may touch the tactile code to identify a pattern formed by the tactile code and then swipe the corresponding acoustic code to learn the notation. The swiping action may generate a sound wave, which may be received by an auxiliary unit that generates a corresponding electrical signal for further analysis. In an example, the electrical signal is processed to obtain a corresponding binary data stream using digital signal processing techniques. The bits in the binary data stream may be grouped into a plurality of data segments to reform data encoded by the acoustic code. The grouping of the bits adjusts for speed of swipe or direction of swipe, thereby ensuring that a semantic interpretation of the tactile code is provided to the user.

Further, the bits may be grouped into the data segments based on code reformation data such that each data segment corresponds to a data block. The code reformation data may include predetermined start and end patterns, and predetermined length of each of the data blocks. A start pattern may be used to identify the start block and thus the start of the acoustic code; an end pattern may be used to identify the end block and thus the end of the acoustic code. Further, remaining bits may be grouped so as to correspond to the information blocks. The data segments grouped as the information blocks may be analyzed based on content data and the information contained in the information blocks that provide field identifiers. These field identifiers provide input for lookup and retrieval of corresponding data pertaining to notations represented by a plurality of tactile codes from the content data. For example, the content data may include look up tables and sound clips corresponding to the notations represented by the tactile codes. Further, based on the analysis, a trigger to generate an aural feedback corresponding to the notation may be provided.

In an example, the capabilities for processing and analysis of the electrical signal corresponding to a sound wave generated upon swiping of acoustic code may be provided through a separate software application, which may be downloaded on a computing device of the user.

The tactile code device as described herein is simple and easy to manufacture since it may have minimum or no electronic components, thereby making it cost-effective. Additionally, since the present subject matter provides for autonomous learning, the user may not have to rely on availability of skilled instructors pertaining to a discipline and may further enhance their knowledge of other disciplines which are of interest to the user. Further, the present subject matter provides empowerment to the users to learn the tactile writing systems at their own pace, aided by the learner-centered instructional content and method. Further, since the acoustic codes are etched on the tactile unit, the acoustic codes may be easily located by visually challenged individuals and swiped using a swiping unit for example, fingernail or a stylus. Thus, the present tactile code device is user friendly and the users may not require any additional assistance. Additionally, the tactile code system is portable, thereby providing flexibility to the user to use the tactile code system at anytime from any location. Accordingly, the present subject matter provides not only for autonomous learning but also provides a cost-effective device for learning and using tactile writing systems, thereby motivating the visually challenged individuals to learn tactile writing systems, which in turn may enhance the literacy rate.

While aspects of described systems and methods can be implemented in any number of different computing systems, environments, and/or configurations, the embodiments are described in the context of the following exemplary system(s).

FIG. 1A illustrates a tactile code interpretation system 100, according to an embodiment of the present subject matter. In an embodiment, the tactile code interpretation system 100, hereinafter referred to as system 100, may include a tactile code device 102 and a computing device 104 associated with the tactile code device 102. The tactile code device 102 may include a plurality of tactile units 106-1, 106-2, . . . 106-n, collectively referred to as tactile unit(s) 106. Each of the tactile units 106 may include a tactile code 108 representing a notation in a given discipline. For example, the tactile codes 108 may represent notations used in languages, scripts, arithmetic, Venn diagrams, sets, trigonometry, matrices, determinants, theorems, geometry, and calculus. In a similar fashion, the tactile codes 108 can be used to represent elements of science, such as periodic tables, chemical formula of individual elements in the periodic table or combinations thereof. Furthermore, the tactile codes 108 may be used to represent notations used in signage, music, and currency symbols. Thus, the tactile codes 108 may be any code, notation, symbol or graphic used in tactile writing systems. The tactile codes 108, in an example, may be of finger length to help the users, i.e., visually challenged individuals, identify the tactile codes 108.

The tactile unit 106, in addition to the tactile code 108, may also include a corresponding acoustic code 110, which is uniquely associated with a corresponding tactile code 108.

For example, the tactile unit 106-1 includes the tactile code 108-1, which corresponds to alphabet "A" in Braille and the acoustic code 110-1, and the tactile unit 106-n includes the tactile code 108-n, which corresponds to number "4" in Braille and the acoustic code 110-n. The acoustic code 110 is marked on the tactile unit 106 in at least one of etched, grooved or embossed pattern. Each acoustic code 110 may be marked so as to produce a unique sound wave, when swiped. The depth of etching or the height of protrusion of markings of the acoustic code 110 and spacing of the various marking is directly correlated to the frequency of the sound waves produced. Thus, by varying any one or more of the depth or the spacing, multiple unique acoustic codes may be designed. Additionally, the acoustic code 110 may be etched in various forms, such as linear, annular, semicircular, circular, conical, ellipse, whorl, prolate, wedged or syncline form. It will be understood that the acoustic code 110 may be marked in any form that can be swiped to produce a sound wave and information pertaining to the tactile code 108 can be contained in a single acoustic code 110.

For interpretation of the tactile codes 108, the tactile code device 102 may be communicatively associated with an auxiliary unit 112. In operation, the acoustic code 110 may be swiped using a fingernail or by a swiping unit provided in the auxiliary unit 112 to generate a sound wave. The generated sound wave may be captured by the auxiliary unit 112 and a corresponding electrical signal may be provided to the computing device 104 for further processing and analysis. Although, the auxiliary unit 112 has been illustrated to be separate from the tactile code device 102 and the computing device 104; it will be understood that the auxiliary unit 112 may be integral to the tactile code device 102 or the computing device 104. In an example, the tactile code device 102 and the computing device 104, together with the auxiliary unit 112, may be manufactured as a single unit.

Referring back to processing of electrical signal by the computing device 104, in an example, the computing device 104 may process the electrical signal to obtain a corresponding binary data stream. The binary data stream may be grouped into data segments corresponding to a plurality of data blocks. Each data block may include metadata, which the computing system 104 can process to accordingly interpret the tactile code. In one implementation, the plurality of data blocks includes a start block, an end block, and one or more information blocks, as will be explained in detail with respect to description of FIG. 1B.

In an implementation, the computing device 104 may group the various bits of the binary data stream into plurality of data segments, each data segment corresponding to a data block. The binary data stream may be grouped based on code reformation data (not shown in the FIG. 1A), as will be explained in detail with respect to FIG. 2. The code reformation data may include predetermined length of each of the data blocks and a list of predetermined start and end patterns. Once grouped, the data segments corresponding to the information blocks are analyzed to determine the semantic interpretation of the tactile code, based on content data (not shown in FIG. 1A) having information pertaining to notations represented by the tactile codes 108. Upon analysis, the semantic interpretation may be provided as an aural feedback to a user. For instance, if the user swiped the acoustic code 110-1, the aural feedback may indicate that the tactile code 108-1 corresponds to alphabet 'A'.

In operation, in order to learn a notation represented by a tactile code 108, a user may touch the tactile code 108 and may swipe a corresponding acoustic code 110 to learn the notation. The sound wave generated on swiping of the acoustic code 110 may be obtained by the auxiliary unit 112, which in turn may provide a corresponding electrical signal to the computing device 104. The computing device 104 may process electrical signal to obtain a corresponding binary data stream. The binary data stream may be further processed and analyzed by the computing device 104 to provide a semantic interpretation of the tactile code 108. Thus, the system 100 may be used as a language learning tool, music learning tool etc. For instance, when the system 100 is used as a music learning tool, the computing device 104 may provide instructions to play music compositions, thereby enhancing the visualization of learning and relating to the musical note.

Figure 1B:
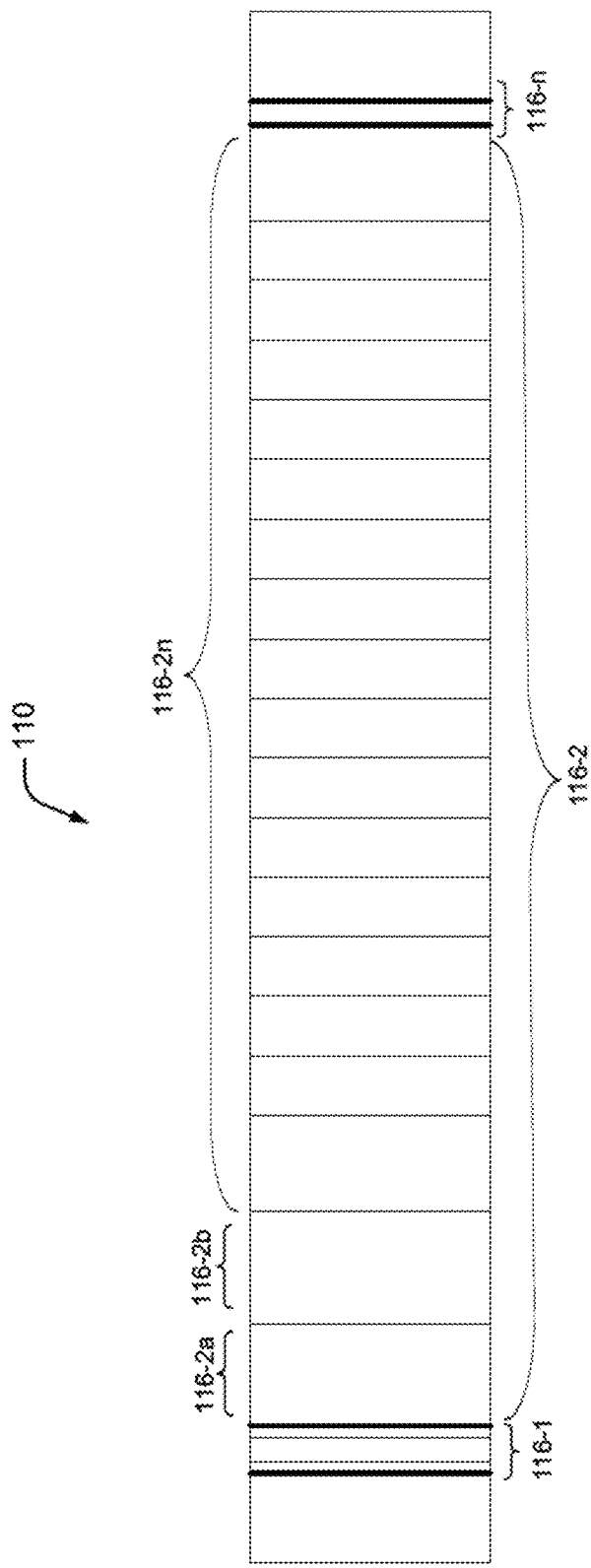
FIG. 1B illustrates different blocks in an acoustic code provided on a tactile unit of the tactile code interpretation system, according to an embodiment of the present subject matter.

FIG. 1B, illustrates the acoustic code 110, according to an embodiment of the present subject matter. In an example, the markings of acoustic code 110 may be provided such that the sound wave generated on swiping the acoustic code 110 includes sound patterns, say, by way of pressure variations in the medium with respect to phase, frequency, and amplitude, corresponding to the plurality of data blocks. For the ease of explanation, the markings may be considered to be divided into a plurality of sets, each set corresponding to one or more data blocks, i.e., each set may produce a sound pattern corresponding to respective data blocks, as illustrated in FIG. 1B. A first set of marking 116-1 may correspond to the start block, a second set of markings 116-2 may correspond to the one or more information blocks, and a third set of markings 116-n may correspond to the end block.

The start block may include a start pattern indicating starting point of the acoustic code 110 and likewise the end block aids in identification of the end of the acoustic code 110. Further, the acoustic code 110 can be considered to be Omni-directional, i.e., the acoustic code 110 may be swiped in either direction, as will be explained in detail with reference to description of FIG. 2.

The information blocks include information pertaining to corresponding tactile code 108 and user preferences. The information blocks may include a discipline block, a classification block, and one or more data payload blocks. As it can be observed, the second set of markings 116-2 may include a set of markings 116-2a corresponding to the discipline block, another set of markings 116-2b corresponding to the classification block, and a last set of markings 116-2n corresponding to the one or more information blocks. The discipline block may indicate a field to which the tactile code relates to, for example, a character set including language and dialect, a type of musical instrument, such as piano or guitar, or a field of study, such as mathematics or science. The classification and data payload blocks indicate specific information pertaining to the notation represented by the tactile code 108.

For instance, in case, the discipline is linguistics, the classification block may indicate phonetics, such as length, tone, stress, and intonation and the data payload blocks may indicate alphabets or notations indicating contractions, indicators, punctuations, and symbols. Likewise, in case the discipline is music, the discipline block may indicate the type of the music instrument, the classification block may indicate flats or sharps, octave, tonality, repeats, sequences, chord note, and rest duration, and the data payload blocks may indicate notes, such as Do, Re, or Mi. In said case, the tactile codes may be in Braille Music Markup Language (BMML). Similarly, in case the discipline is mathematics or science, the classification block may indicate operators, numbers, fractions, parenthesis, modifiers, geometry, etc., and the data payload blocks may indicate the value of notation.

Figure 1C:
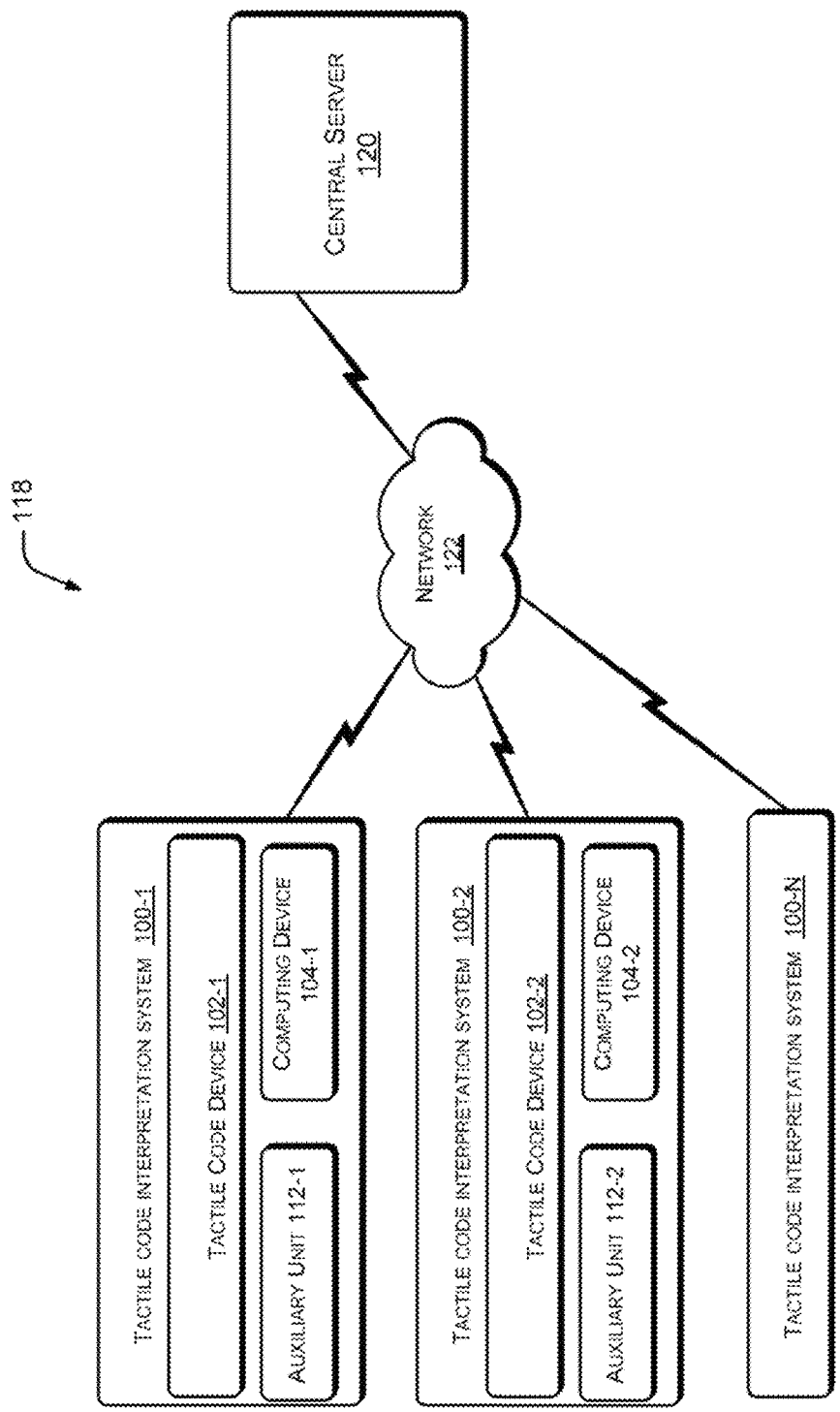
FIG. 1C illustrates a network environment implementing multiple tactile code interpretation systems, according to an embodiment of the present subject matter.

FIG. 1C illustrates a network environment 118 implementing multiple systems 100, according to an embodiment of the present subject matter. In an implementation, a plurality of users may collaborate for activities, such as quizzing or gaming, to enhance learning and competiveness. The users may interact with each other through their corresponding systems 100-1, 100-2, . . . 100-n, collectively referred to as systems 100, over a network 122, to a central server 120. The network 122 may be a wireless network, wired network or a combination thereof. The network 122 can be implemented as one of the different types of networks, such as intranet, local area network (LAN), wide area network (WAN), the internet, cellular data network and such. The network 122 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate in a networked environment.

In a networked implementation, a user, through the corresponding system 100, may connect to the central server 120, for autonomous learning. The central server 120, like the computing device 104, may be configured to analyze and process the electrical signals, which may be received from the system 100. As mentioned earlier, the user may swipe the acoustic codes 110 and a corresponding electrical signal may be provided to the central server 120 through the computing system 104. The central server 120 upon processing and analyzing the received electrical signal may perform a corresponding action. The action may be for example, providing a semantic interpretation of the notations corresponding to the swiped acoustic codes 110, providing a response, which may be played as an aural feedback by the system 100-1, indicating whether correct acoustic codes 110 are swiped; or, performing an action as indicated by the swiped acoustic codes 110. Although, in FIG. 1C, the system 100 has been illustrated to be connected to the central server for purpose of autonomous learning, it will be understood that the computing device 104 itself can serve the functions of the server 120, for a user in standalone mode.

In another implementation, multiple users through their corresponding systems 100 may connect to the central server 120 for collaborative learning. In an example, the central server 120 may throw challenges to a group of users and the users may be prompted to respond to the challenges. Based on the received responses, the central server 120 may update a score board to enhance competitiveness among the users. For instance, two users may connect to an application on the central server 120 to evaluate their proficiency in a language. To evaluate the users, the central server 120 may request both the users to spell a word. It will be understood that the central server 120 may provide an audio pronunciation of the word to be spelled. Accordingly, both the users may select the tactile units 106, of corresponding tactile code devices 102, say tactile code device 102-1 and 102-2, to spell the word. Each user may then swipe the acoustic codes 110 of the selected tactile units 106 to generate a sound wave. The electrical signals corresponding to the generated sound waves may be provided by the associated computing device 104, say 104-1 and 104-2 to the central server 120. The central server 120 may analyze the received electrical signals corresponding to the notation on the tactile code device 102, interprets the word and evaluates the result to update the score board. Further, based on the analysis, the central server 120 may provide an aural feedback indicating that the word is spelt correctly or incorrectly, or who spelt it first. Additionally, the user may be provided with hints or clues to select the correct set of tactile codes.

Further, in another example of said implementation, visually challenged users and sighted users may collaborate over the network 122. It will be understood that a visually challenged users may communicate using the system 100, while other sighted users may communicate using a regular computing device. Further, the central server 120, in addition to processing the electrical signals provided by the tactile code interpretation system 100, may also be configured to analyze the inputs provided the regular computing device corresponding to a sighted users. Thus, the visually challenged users, may not only collaborate with other visually challenged users, but also with their sighted peers. It should be noted that extensions of this implementation may allow the visually challenged users to enter mainstream on social and collaborative networks where the sighted users hitherto registered their pervasive presence.

Although the present subject matter has been explained in considerable detail with respect to learning of the tactile codes; it will be understood that the system 100 may be extended for other activities as well. For example, the users may use the system 100 to interact with other such systems for playing recreational games, such as chess. In such cases, the acoustic codes 110 may be provided on each piece and each block of a chessboard to identify a piece and the corresponding position of the piece. Similarly, Sudoku puzzles can be created and played from such n×n boards.

Figure 2:
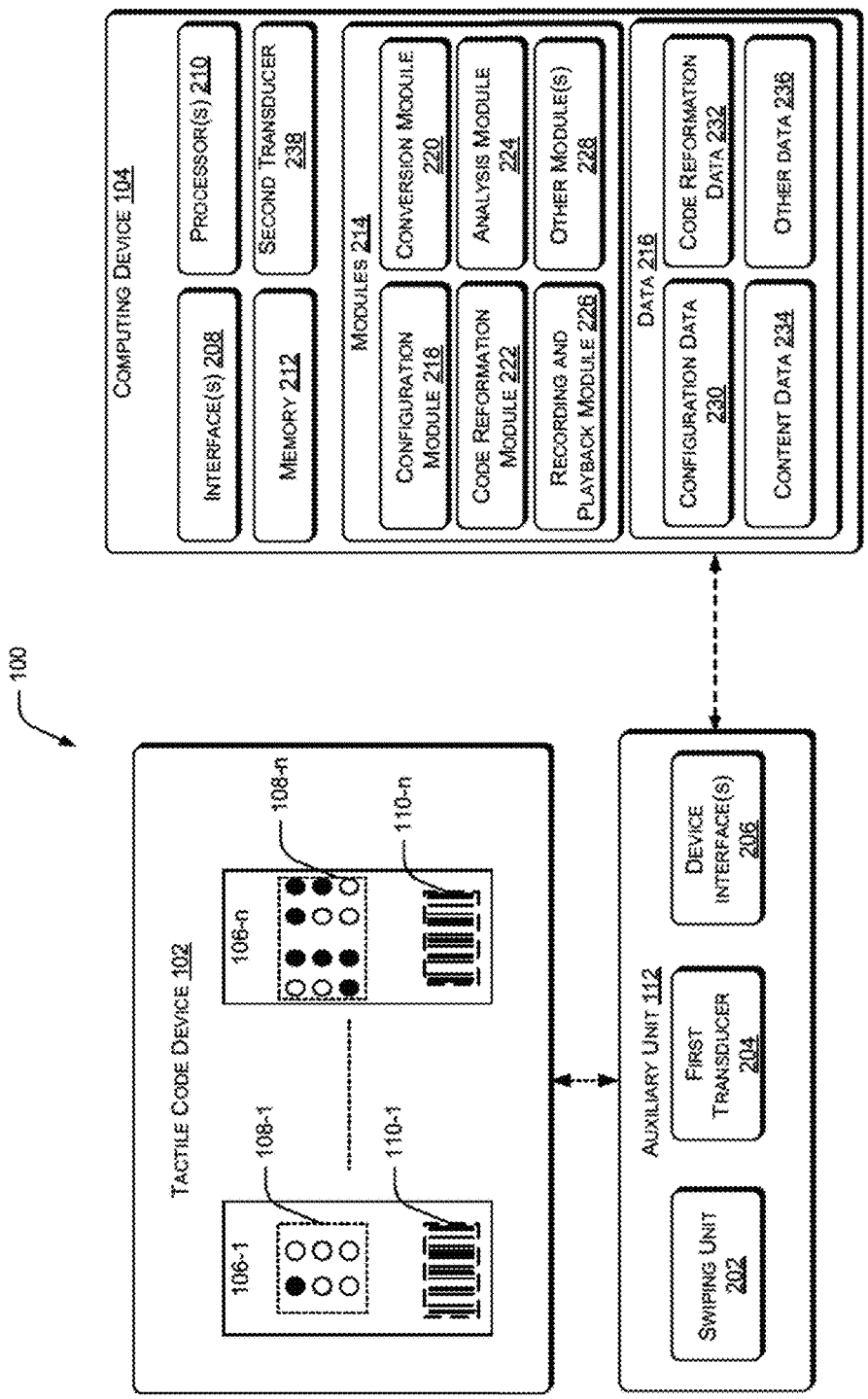
FIG. 2 illustrates various components of the code interpretation system, according to an embodiment of the present subject matter.

FIG. 2 illustrates various components of the system 100, according to an embodiment of the present subject matter. As explained earlier, the tactile code device 102 may be coupled to the computing device 104 through the auxiliary unit 112. The auxiliary unit 112 includes a swiping unit 202, a first transducer 204, and device interface(s) 206. Further, it will be understood that some components of the auxiliary unit 112 may be integral to the tactile code device 102, while some others may be integral to the computing device 104. For example, the swiping unit 202 may be integrated with the tactile code device 102 and the first transducer 204 may be integrated with the computing device 104.

In an implementation, a user may swipe the acoustic code 110 using the swiping unit 202 or a fingernail, which may function as the swiping unit 202. The swiping unit 202 may include, for example, a stylus, a pin, or a knob. A sound wave generated due to the swiping action may be captured by the first transducer 204, such as a microphone. Further, a corresponding electrical signal may be provided to the computing device 104 through the device interface 206, such as a plug-and-play (PnP) interface, including but not limited to, Universal Serial Bus (USB), IEEE1394 ("FireWire"), a PC Card, the CardBus interface, and the PCI interface, for further processing and analysis. The device interface 206 may not be limited to wired interfaces and but may also include wireless communication interfaces including infrared, Bluetooth and radio communication.

The computing device 104 can be implemented using computing systems that include, but are not limited to, desktop computers, hand-held devices, such as mobile phones and smart phones, multiprocessor systems, personal digital assistants (PDAs), laptops, and the like. In an implementation, the computing device 104 includes interface(s) 208 and one or more processor(s) 210. The interfaces 208 may include a variety of software and hardware interfaces, for example, interfaces for peripheral device(s), such as a keyboard, a mouse, a microphone, touch pad, and a stylus. Further, the interfaces 208 may enable the computing device 104, to communicate with other devices, such as web servers, other computing devices, external databases, and the tactile code device 102. The interfaces 208 can facilitate multiple communications within a wide variety of networks, and protocol types, including wired networks, for example, local area network (LAN), cable, etc., and wireless networks such as Wireless LAN (WLAN), cellular, or satellite.

The processor 210 may be implemented as one or more microprocessors, microcomputers, microcontrollers, digital signal processors, central processing units, state machines, logic circuitries, and/or any devices that manipulate signals based on operational instructions. Among other capabilities, the processor 210 is configured to fetch and execute computer-readable instructions stored in a memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In an implementation, the computing device 104 may include a memory 212. The memory 212 may be communicatively coupled to the processor 210. The memory 212 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the computing device 104 may include module(s) 214 and data 216. The modules 214 and the data 216 may be coupled to the processor 210. The modules 214, amongst other things, include routines, programs, objects, components, data structures, etc., which perform particular tasks or implement particular abstract data types. The modules 214 may also be implemented as, signal processor(s), state machine(s), logic circuitries, and/or any other device or component that manipulate signals based on operational instructions.

The modules 214 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 214 may be machine-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The modules 214 include, for example, a configuration module 218, a conversion module 220, a code reformation module 222, an analysis module 224, a recording and playback module 226, and other module(s) 228. The other modules 228 may include programs that supplement applications on the computing device 104, for example, programs in the operating system.

Further, the data 216 serves, amongst other things, as a repository for storing data processed, received, and generated by one or more of the modules 214. The data 216 includes, for example, configuration data 230, code reformation data 232, content data 234, and other data 236. The other data 236 may include data generated as a result of the execution of one or more modules in the other modules 228.

In an implementation, prior to initiating tactile code interpretation, the system 100 may be configured based on configuration attributes. The configuration attribute may include for example, a mode, such as learning mode or evaluation mode with progressive competency levels, which may be in the form of a quiz; output voice, such as, male voice or female voice; learning attribute, for instance, a user may choose to learn pronunciation only or pronunciation in combination with an example; and recording attribute indicating whether an output is to be recorded or not. The configuration module 218 may prompt a user to provide inputs corresponding to the configuration attributes. For example, the configuration module 218 may provide and receive voice commands for configuring the computing device 104, based on user preferences. The configuration attributes and the inputs provided by the user may be stored in the configuration data 230. For instance, consider that the user had selected learning mode, female voice, and only pronunciation as the configuration attributes. In said example, once the user swipes the acoustic code 110, pronunciation of corresponding notation is provided by a female voice. Similarly, in evaluation mode, the computing device 104 may throw challenges to the user to evaluate the user.

In either of the modes described earlier, an electrical signal is provided to the computing device 104 for further processing. In an example, the conversion module 220 may convert the received analog electrical signal into a corresponding binary data stream using digital signal processing techniques. Using digital signal processing techniques, such as Fast Fourier transform, discrete samples of the electrical sample are obtained in the frequency domain. Further, using digital filtering techniques, a digital equivalent of the electrical signal, which is an analog signal, is obtained as a series of binary digits. The series of binary digits may be referred to as the binary data stream, which is further processed by the code reformation module 222.

The code reformation module 222 may group bits in the binary data stream into data segments based on code reformation data 232. The code reformation data 232 includes a list of predetermined start and end patterns; and a predetermined length of each of the data blocks. In an example, each acoustic code 110 may be etched such that a start pattern and an end pattern of the acoustic code 110 correspond to the predetermined start and end patterns. Based on the predetermined start and end patterns, the code reformation module 222 may identify a direction of swipe. Further, based on the code reformation data 232, the data segments that correspond to the start and end block, i.e., start and end patterns, may be determined. Additionally, in case multiple acoustic codes 110 are swiped, say while learning words, each character may be identified based on the start and end patterns encoded by the acoustic codes 110.

Also, since the speed at which two individuals swipe the acoustic code 110 may not be the same, the code reformation module 222 may adjust the lead or lag in the binary data stream in the time domain. The code reformation module 222 may calibrate for the speed of the swipe, based on the spacing of individual peaks corresponding to codes within the start pattern stored the code reformation data 232. A digital equivalent of a marking in the start pattern may be understood as a code of the start block. Hence, the speed of swiping the acoustic codes 110, which may be different for different individuals, even different for the same person over time, becomes irrelevant.

Thus, irrespective of the direction of swipe and mechanical speed of swipe, the code reformation module 222 may reform data encoded by the acoustic code, thereby making it easy for the visually challenged individuals to use the tactile code device 102.

Upon identification of the data segments corresponding to the start block and the end block, the code reformation module 222 may group rest of the bits in to data segments corresponding to one or more information blocks, based on the predetermined length of the information blocks. Further, to make analysis independent of swipe direction, bits within a data segment may be shifted based on position of the start block in the obtained binary stream. Additionally, bits in the binary data stream may be segregated based on a predetermined length of each of the data blocks to group the bits into the plurality of data segments. Thus, irrespective of the direction of swipe the binary data stream is grouped into corresponding data blocks.

The grouped data stream may be analyzed by the analysis module 224 to provide a semantic interpretation of the tactile code 108. The analysis module 224 may determine the data segments corresponding to the information blocks to obtain a composite key. In an example, the composite key may include data segments corresponding to discipline block and data payload blocks. The analysis module 224 may fetch information pertaining to the notation represented as the tactile code 108 from the content data 234 using the composite key. The content data 234 may include a look up table including a value corresponding to each composite key and a sound clip, corresponding to each value identifying a notation.

Thus, based on the composite key, a corresponding sound clip is identified from the content data 234. Upon identification, the analysis module 224 may obtain configuration related inputs from the configuration data 230. Based on the user preferences and information provided by the classification block, an aural feedback of the identified sound clip may be determined. The classification block may indicate phonetics, stress, intonation, etc. The analysis module 224 determines the prosody and provides it with the aural feedback. For instance, in case a user is learning word formations and swipes acoustic codes on multiple tiles, the analysis module 224 generates a prosody, taking into account the correct syllabification principles from the combined information of preceding and following notation from multiple tiles. For example, a word 'shellfish' and another word 'selfish' have only a slight allophonic variation at the syllable boundary and the articulation of these words are determined with the right syllabification principles, considering the preceding and following vowel of each syllable. Further, the analysis module 224 may provide a trigger to the recording and playback module 226 to provide the determined aural feedback to the user through a second transducer 238, such as a speaker.

In an example, if the user had initially selected female voice and had indicated that output should be saved, then the recording and playback module 226 may generate the aural feedback providing a semantic interpretation of the tactile code 106 in a female voice. The aural feedback may also be recorded so that it may be played again, if required. Based on a repeat trigger provided by the user, say, a voice command, the recording and playback module 226 may play the aural feedback again. Thus, a user need not swipe the same acoustic code(s) 110 again and again, thereby making it easier for the user to use the system 100.

Figure 3A:
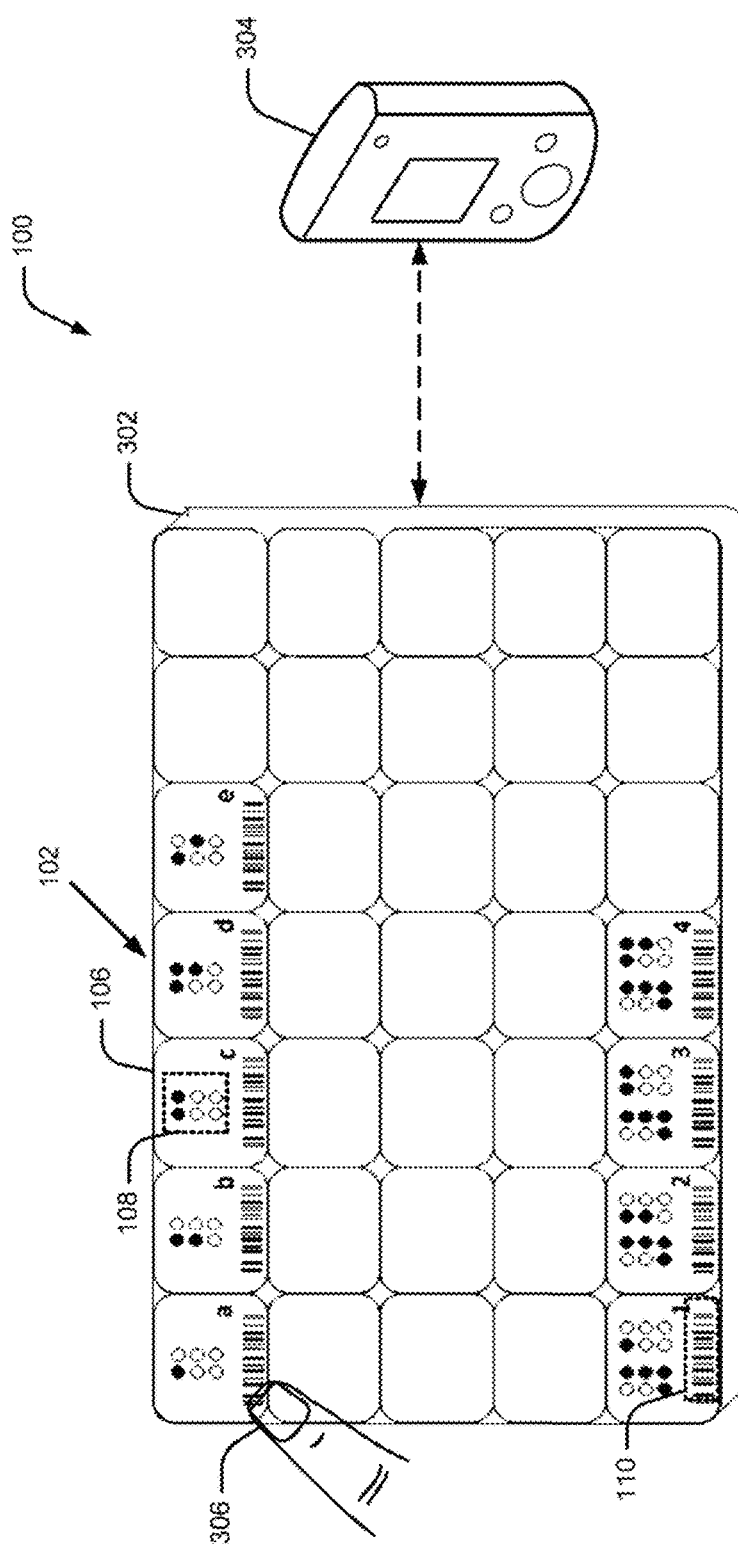
FIG. 3A illustrates the tactile code interpretation system having fixedly attached tactile units mounted on a base, in accordance with an implementation of the present subject matter.

FIG. 3A illustrates the tactile code device 102 with fixedly attached tactile units 106, according to an embodiment of the present subject matter. In said embodiment, the tactile code device 102 may be used for autonomous learning. As illustrated, the tactile code device 102 includes a base 302 having the tactile units 106. The tactile units 106 may be fixedly attached to the base 302. In an example, the base 302 and the tactile units 106 may be of synthetic or recyclable material, thereby not only making the system 100 cost effective, but also, portable. Further, as mentioned earlier, each tactile unit 106 includes the tactile codes 108 and the acoustic code 110.

In said embodiment, the tactile code device 102 may be coupled to a mobile phone 304, which may function as the computing device 104. Further, the mobile phone 304 includes auxiliary components, such as the first transducer 204 (not shown in FIG. 3A) say, a microphone. Also, since, the first transducer 204 integrated with the mobile phone 304, the device interface 206 may not be required. In order to further minimize the cost involved, a user may swipe the acoustic codes 110 using his fingernail 306 instead of using an externally provided swiping unit 202. Thus, in the present case, the fingernail 306 may perform the functions of the swiping unit 202.

In operation, when the user may swipe the acoustic code 110 with the fingernail 306, a sound wave may be generated, which is captured by the first transducer 204 provided in the mobile phone 304. The first transducer 204 may provide the corresponding electrical signal for further processing and analysis. Similar to processing and analysis mentioned above, the mobile phone 304 may generate an aural feedback, through the second transducer 238 (not shown in FIG. 3A) say, a speaker, providing a semantic interpretation of the tactile code 108 corresponding to the swiped acoustic code 110.

Figure 3B:
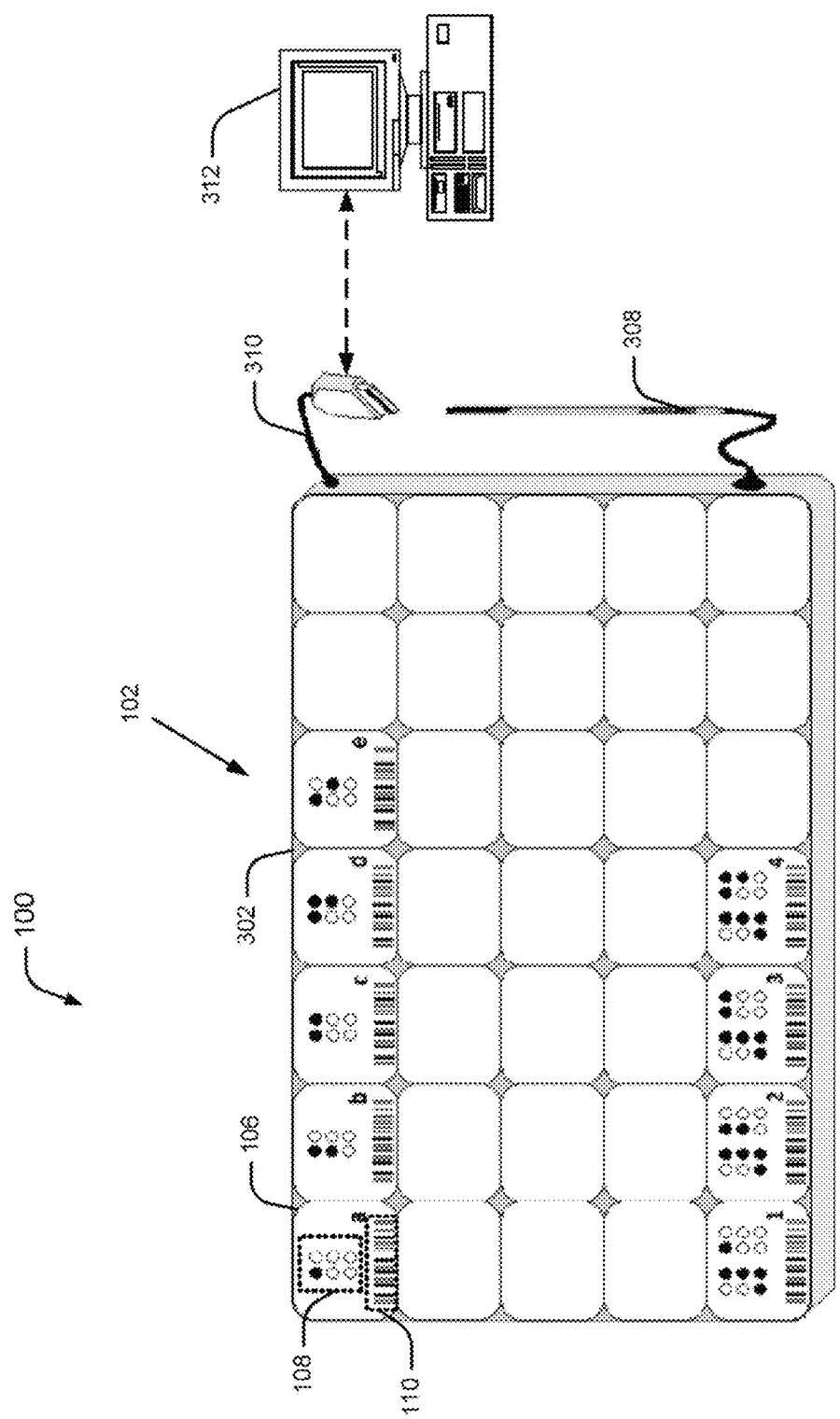
FIG. 3B illustrates the tactile code interpretation system having fixedly attached tactile units mounted on the base, in accordance with another implementation of the present subject matter.

FIG. 3B illustrates the tactile code device 102 with fixedly attached tactile units 106, according to another embodiment of the present subject matter. Similar to FIG. 3A, the tactile code device 102 includes the base 302 having fixedly attached the tactile units 106. As indicated, each tactile unit 106 includes the tactile code 108 and the acoustic code 110. In said embodiment, the tactile code device 102 may include the auxiliary components, for example, a stylus 308, which functions as the swiping unit 202, the first transducer 204 (not shown in FIG. 3B), and a USB connector 310, which functions as the device interface 206. In an example, the stylus 308 has the first transducer 204. The acoustic code 110 may be swiped using a tip of the stylus 308, which functions as the swiping unit 202. Further, the generated sound wave may be captured by the embedded microphone, which functions as the first transducer 204, of the stylus 308. The corresponding electrical signal is provided to the associated computing device 104, say a Personal Computer 312 through the USB connector 310. The Personal Computer 312 may process and analyze the electrical signal to provide the aural feedback providing a semantic interpretation of the tactile code 108.

Figure 4B:
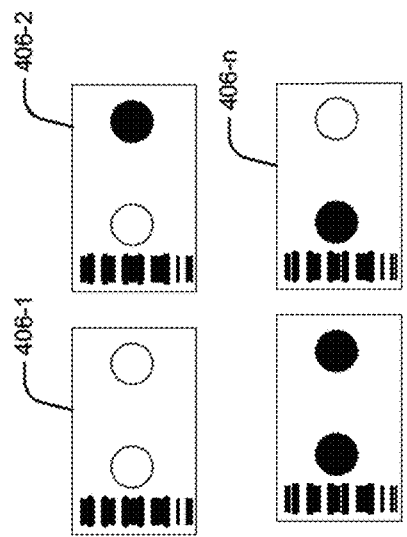
FIG. 4A and FIG. 4B illustrate the tactile code interpretation system with rotatably attached tactile units, in accordance with another implementation of the present subject matter.
Figure 4A:
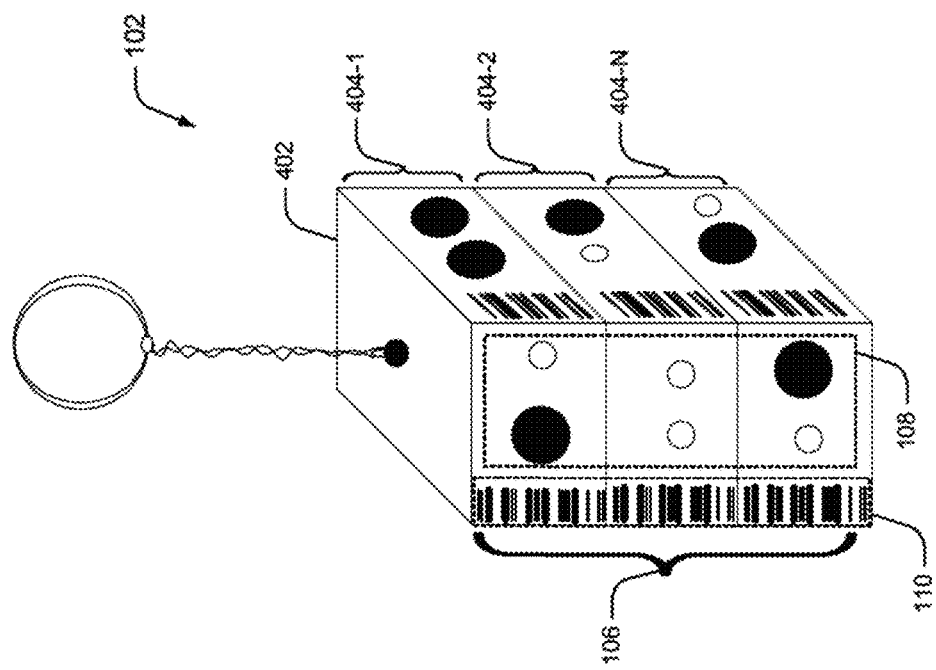

FIG. 4A illustrates the tactile code device 102 with rotatable tactile units 106, according to an embodiment of the present subject matter. In said embodiment, the tactile code device 102 is provided as a fob-like structure 402, which is portable and is a pocket-friendly accessory. The fob-like structure 402 includes a plurality of polyhedron blocks 404-1, 404-2, . . . 404-n. The plurality of polyhedron blocks 404-1, 404-2, . . . 404-*n* may be collectively referred to as polyhedron blocks 404. Further, each polyhedron block 404 may have multiple tactile faces and one or more non-tactile base faces. For example, in case the polyhedron block 404 is a cube, the polyhedron block 404 may have four tactile faces 406-1, 406-2, . . . 406-*n* (shown in FIG. 4B) and two non-tactile base faces. The tactile faces 406-1, 406-2, . . . 406-*n* may be collectively referred to as 406. Each tactile face may include a portion of the tactile code 108 and a portion of the acoustic code 110, such that multiple polyhedron blocks 404 may combine to form a single tactile unit 106. For example, three polyhedron blocks 404 may combine to form a tactile code 108 corresponding to a six-dot character in Braille.

To form the fob-like structure 402, a non-tactile base face of one polyhedron block 404 may rest on a non-tactile base face of another polyhedron block 404. Further, multiple polyhedron blocks 404 may be stacked such that they form a tactile surface of the fob like structure 402, where the tactile surface functions as a tactile unit 106. In the embodiment illustrated in FIG. 4A, three polyhedron blocks 404 combine to form four tactile surfaces, i.e., four tactile units 106. Further, the polyhedron blocks 404 may be used to produce at least $m^n$ patterns of tactile code combinations, where m is number of tactile faces of a polyhedron block 404 and n is number of polyhedron blocks 404. Referring to the embodiment illustrated in FIG. 4A, it can be gathered that for a fob having three polyhedron blocks and four tactile surfaces, $4^3$ combinations, i.e., 64 combinations of six-dot Braille characters are available.

Further, each of the polyhedron blocks 404 may be free to rotate or flip around a central axis of the fob-like structure 402. Accordingly, the flip of a single polyhedron block 404 may lead to change in tactile units 106 formed by the tactile surfaces of the fob-like structure 402.

In operation, the user may align the polyhedron blocks 404 to form a tactile code 108 and swipe the acoustic code 110 by a fingernail or a swiping unit 202 (not shown in FIG. 4A) to interpret the tactile code 108 formed. The sound wave thus generated may be processed by the computing device 104 (not shown in FIG. 4) to help the user identify the notation corresponding to the tactile code 108.

Figure 5:
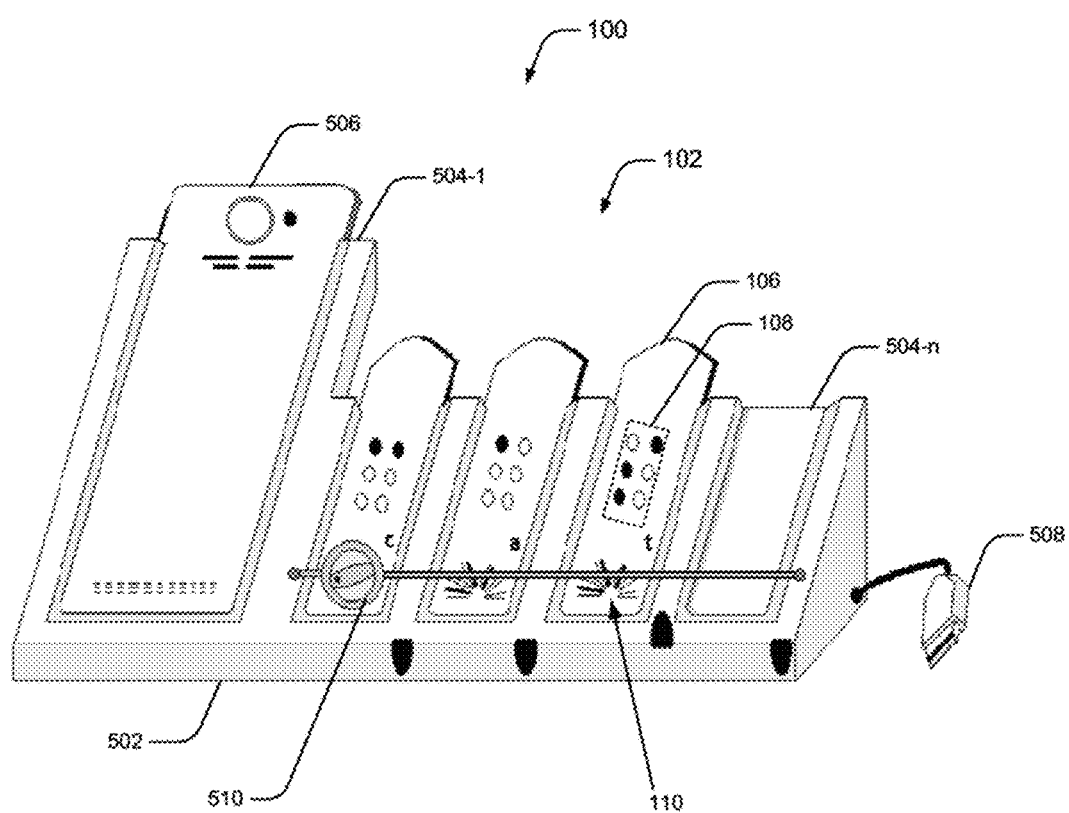
FIG. 5 illustrates the tactile code interpretation system with removably attached tactile units, in accordance with another implementation of the present subject matter.

FIG. 5 illustrates the system 100 with the tactile code device 102 having removably attached tactile units 106 with manual swiping action, according to an embodiment of the present subject matter. The user may use the tactile code device 102 as described with reference to FIG. 5 for arranging the tactile units 106 to form composite structures, for example, words, equations and musical score. In said embodiment, the system 100 includes a mounting structure or a base 502 having a plurality of slots 504-1, . . . 504-*n*, for mounting the computing device 104 and the tactile units 106. It can be observed that the plurality of slots 504-1, . . . 504-*n*, collectively referred to as slots 504, along with the tactile units 106 form the tactile code device 102. Further, one of the slots, say slot 504-1 functions as a docking station to receive the computing device 104, such as a mobile phone 506. In said embodiment, the tactile units 106 may be provided as removable tiles, which fit in to the slots 504. Further, the slots 504 may have hinges to fix the tactile units 106 at the particular slots 504 to prevent the tactile units 106 from falling off. As illustrated, each tactile unit 106 includes the tactile code 108 and a corresponding acoustic code 110. The acoustic code 110 may be provided in form of a curved structure as illustrated in FIG. 5.

Further, in an example, the tactile code device 102 may be provided with auxiliary components, for instance, a USB connector 508 may be provided as the device interface 206 and a knob 510 may be provided as the swiping unit 202. Further, the knob 510 may have a wiper blade stylus for swiping the acoustic code 110, which is provided as a curved structure. In said embodiment, the knob 510 may be moved linearly to shift from one tactile unit 106 to other till the end of the arrangement of the tactile units 106 on the base 502. Further, once on a tactile unit 106, in order to swipe the corresponding acoustic code 110, the knob 312 may be dragged over the acoustic code 110 to produce the corresponding sound wave, which is captured by a microphone of the mobile phone 506. The electrical signal corresponding to the sound wave may be processed and analyzed by the mobile phone 506.

In an implementation, the system 100 illustrated in FIG. 5 may be used as a language learning tool. Further, the users may learn to build words using the system 100. For example, consider that the user has cleared a particular proficiency level and may choose an evaluation mode to test his spelling skills. The analysis module 224 may request the user to spell the word "cat". Accordingly, an audio pronunciation of "cat" may be played to the user and the user may be requested to spell cat. It will be understood that the audio pronunciation may be provided to the user via a speaker of the mobile phone 506. The user, based on his proficiency level, may fix tactile units 106 corresponding to "c", "a", and "t" and swipe the acoustic codes 110 of the three tactile units 106 in a single swipe. The code reformation module 222, based on the code reformation data 232 may reform the data encoded by the acoustic codes 110 swiped by the user. Further, the analysis module 224 may analyze the reformed data to determine whether the tactile code 108 corresponding to each character of the word have been correctly identified by the user or not. The result may be played out to the user. In case the user has not correctly spelled the word, the analysis module 224 may aid in identifying the misspelt characters corresponding to the word. For the purpose, the analysis module 224 may provide an audio pronunciation of the each character and a way to identify the corresponding tactile code. Similarly, in other implementations, for gaining knowledge pertaining to other disciplines, corresponding tactile codes 108 may be provided on the tactile units 106. For example, to learn the musical notes, the tactile units 106 may represent Solresol characters.

Figure 6A:
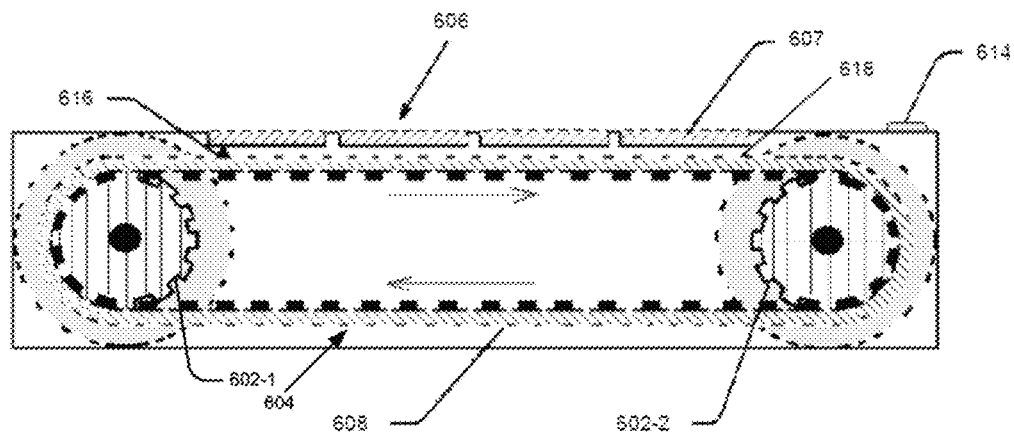
FIG. 6A and FIG. 6B illustrates the tactile code interpretation system with removably attached tactile units, in accordance with another implementation of the present subject matter.

FIG. 6A illustrates a cross-sectional view of the tactile code device 102 with removably attached tactile units 106 with automatic swiping action, according to an embodiment of the present subject matter. Similar to FIG. 5, the user may use the tactile code device 102 of FIG. 6A to form composite structures, for example, words, equations and musical score. In said embodiment, the tactile code device 102 includes at least two gears 602-1 and 602-2 and a conveyor belt unit 604. The conveyor belt unit 604 includes an upper plate 606, which may act as a base to receive the tactile units 106, a lower plate 618 to perform automatic swiping action, and a conveyor belt 608 to provide movement to the lower plate 618 for automatic swiping. Further, the upper plate 606 may be non-movable and a user may arrange the tactile units 106 on the upper plate 606 to form the composite structure. Additionally, the lower plate 618 may be movable and may work in conjunction with an actuator 614 to perform the swiping action.

In operation, the user may arrange the tactile units 106 (shown in FIG. 6B) on the upper plate 606, based on the composite structure to be formed. The upper plate 606 may include a plurality of slots, such as slot 607, to receive the tactile units 106, which may be provided as removable tiles.

Figure 6B:
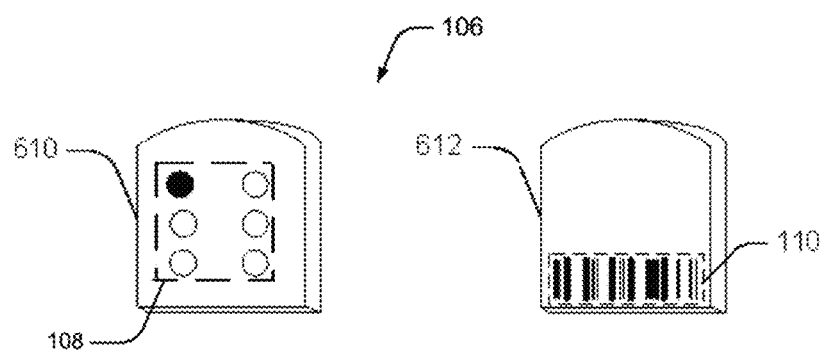

Further, as shown in FIG. 6B, the tactile codes 108 and acoustic codes 110 may be provided on opposite faces 610 and 612 respectively of the tactile units 106. In said embodiment, a top surface 610 of the tactile unit 106 may include the tactile code 108 and a bottom surface 612 may include the acoustic code 110. Upon arranging the tactile units 106 on the upper plate 606, a user may actuate the tactile code device 102 to perform the automatic swiping action. For instance, the tactile code device 102 may include the actuator 614, which may be triggered to signal the completion of the composite structure and to impart the motion of the lower plate 618. The actuator 614 may be a motorized one and may be provide by way of a button. Alternatively, the actuator 614 may be a mechanical one and may be provided by way of a handle. The actuator 614 may actuate the gears 602, which in turn may impart motion to the lower plate 618.

Further, the lower plate 618 may include a pin 616, which may automatically swipe the acoustic codes 110 provided on the bottom surface 612 of each of the tactile units 106. The electrical signal corresponding to the sound wave generated upon swiping of the acoustic codes 110 may be obtained by the computing device 104 (not shown in FIG. 6A). The computing device 104 may process the electrical signal to provide a semantic interpretation of the composite structure. Further, as mentioned earlier, the system 100 as illustrated in FIG. 6 may used in any mode, say, learning mode or evaluation mode.

Thus, in said embodiment, the user may not have to manually swipe the acoustic codes 110, which in turn may enhance user experience and motivate the user to learn tactile writing systems. Additionally, since embodiments of FIG. 5 and FIGS. 6A and 6B provide an option of having removable tactile units 106 without altering the base structures, the same tactile code device 102 may be used to for learning various tactile writing systems. Accordingly, the present subject matter provides simple to use and cost efficient systems for learning and using tactile codes.

Figure 7:
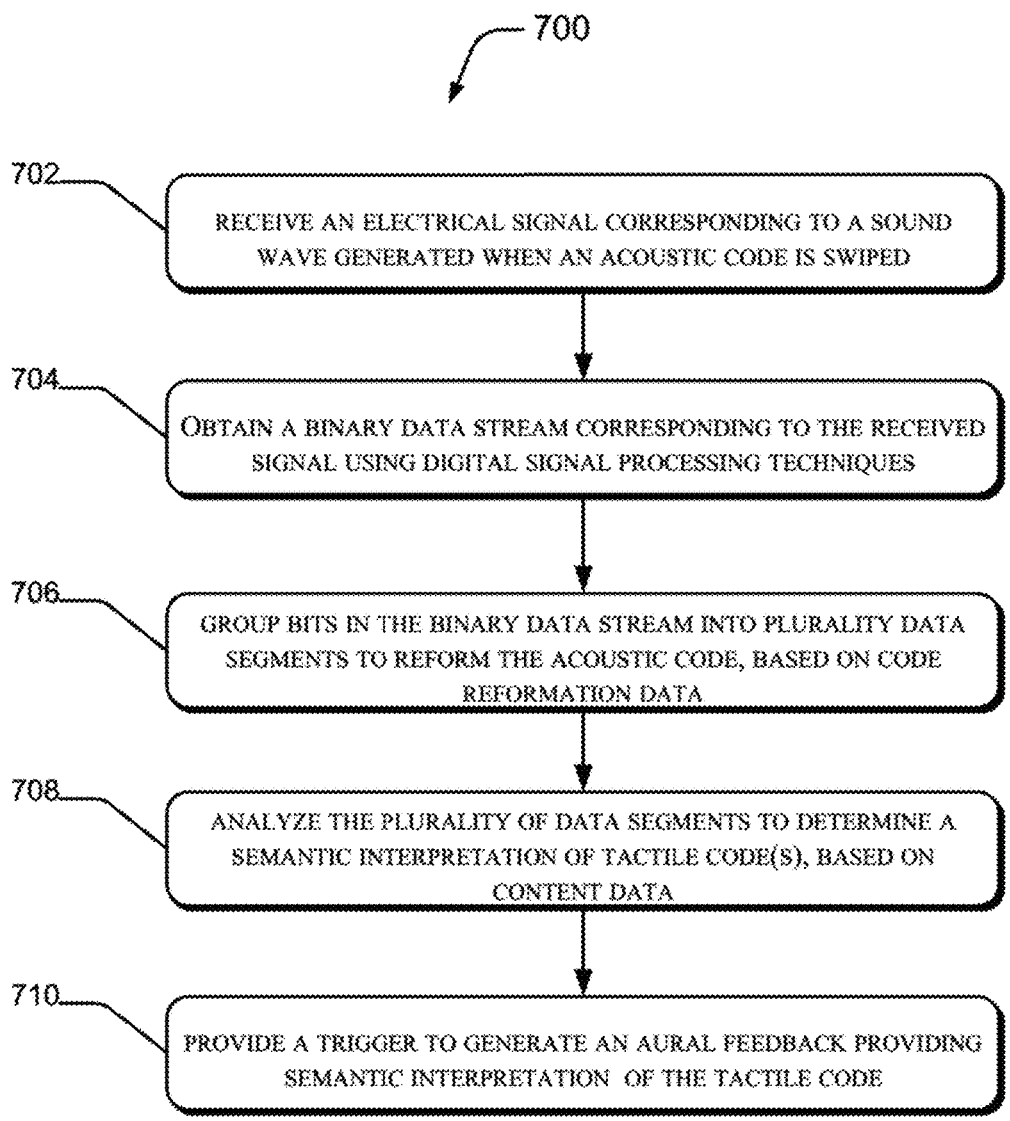
FIG. 7 illustrates a method to facilitate semantic interpretation of tactile codes, according to an embodiment of the present subject matter.

FIG. 7 illustrates a method 700 for providing a semantic interpretation of a tactile code, according to an embodiment of the present subject matter. In an example, the method 700 may be performed by a computing device, say, the computing device 104, to determine semantic interpretation of the tactile code 108 provided on a tactile code device 102.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 702, an electrical signal corresponding to a sound wave generated when an acoustic code is swiped is received. For example, when a user swipes the acoustic code, the generated sound wave may be obtained by a first transducer and the first transducer may provide the corresponding electrical signal. Further, the acoustic code may encode data pertaining to the corresponding tactile code. The data may include a plurality of data blocks including, for example, a start block, an end block, and one or more information blocks. In an example, the conversion module 220 may receive the electrical signal.

At block 704, binary data stream corresponding to the electrical signal is obtained, using digital signal processing techniques. For instance, the conversion module 220 may convert the electrical signal, which an analog signal, into a corresponding digital signal. The digital signal may represent the binary data stream, which is processed further.

At block 706, bits in the binary data stream are grouped into a plurality of data segments based on code reformation data. Further, the bits may be grouped such that each data segment corresponds to a data block from the plurality of the data blocks encoded by the acoustic code. The code reformation data may include length of each of the data blocks and predetermined start and end patterns corresponding to the start and end blocks. In an example, the code reformation module 222, based on the code reformation data 232, may identify the data segments corresponding to the start and the end blocks. Further, the code reformation module 222 may shift one or more bits in a data block and accordingly bits may be grouped into the data segments irrespective of the direction and speed of the swipe.

At block 708, the data segments are analyzed to determine a semantic interpretation of the tactile code, based on content data. For example, the analysis module 224 may determine the data segments corresponding to the information blocks to obtain a composite key. In an example, the composite key may include data segments corresponding to discipline block and data payload blocks. Using the composite key, information pertaining to the notation represented as the tactile code 108 may be fetched from the content data, say, the content data 234. Based on the composite key, a corresponding sound clip is identified from the content data 234. Further, in an example, upon identification, the analysis module 224 may obtain configuration related inputs from the configuration data 230.

At block 710, a trigger to generate an aural feedback providing the semantic interpretation of the tactile code is provided. In an example, the analysis module 224, based on the configuration data 230, identified sound clip, and information provided by the data segment corresponding to a classification block, an aural feedback to be provided to the user may be determined. The analysis module 224 may provide the aural feedback to be played to out to the user to the recording and the playback module 226. Further, the recording and playback module 226 may provide the aural feedback to the user through a transducer, such as speaker.

Although embodiments for the described systems and methods have been described in language specific to structural features and/or methods, it is to be understood that the invention is not necessarily limited to the specific features or methods described. Rather, the specific features and methods are disclosed as exemplary embodiments for the described systems and methods.

We claim:

1. A tactile code interpretation system comprising a tactile code device, wherein the tactile code device comprises:
   a plurality of tactile units, each of the tactile units having marked thereon:

a tactile code for representing a notation; and
a corresponding acoustic code engraved on the tactile unit, wherein the acoustic code comprises encoding information pertaining to a plurality of data blocks, wherein the corresponding acoustic code, when swiped, generates a unique sound wave to facilitate semantic interpretation of the tactile code, and wherein the plurality of data blocks comprise:
  a start block corresponding to a start pattern;
  an end block corresponding to an end pattern; and
  one or more information blocks corresponding to information pertaining to the tactile code; and
a computing device to process the unique sound wave for determining the semantic interpretation of the notation represented by the corresponding tactile code, wherein the computing device comprises:
a processor;
a code reformation module, executable by the processor, to
  obtain a binary data stream corresponding to the unique sound wave; and group bits in the binary data stream into a plurality of data segments to reform data encoded by the acoustic code, wherein each data segment corresponds to a data block encoded by the acoustic code, and wherein the binary data stream is grouped based on code reformation data, the code reformation data including a length of each data block, predetermined start pattern and predetermined end pattern by:
    identifying a direction in which the acoustic code is swiped, based on the predetermined start pattern and the predetermined end pattern;
    shifting one or more bits in the binary data stream within a data segment, based on a position of the predetermined start pattern and the predetermined end pattern in the binary data stream;
    segregating, based on the length of each data block, bits in the binary data stream to group the bits into the plurality of data segments; and
    calibrating for a speed of the swipe, based on spacing of individual peaks corresponding to codes within the start pattern stored in the code reformation data; and
an analysis module, executable by the processor, to
  gather the one or more information blocks from the reformed data; determine the notation represented by the corresponding tactile code based on the one or more data blocks and content data, wherein the content data includes data pertaining to notations represented by a plurality of tactile codes; and
  provide a trigger to generate an aural feedback corresponding to the notation.

2. The tactile code interpretation system as claimed in claim 1, wherein the tactile code is at least one of a code, a notation, a symbol, and a graphic used in tactile writing systems.

3. The tactile code interpretation system as claimed in claim 1, wherein the one or more information blocks comprise:
  a discipline block corresponding to discipline;
  a classification block corresponding to classification; and
  a plurality of data payload blocks corresponding to data payload,
  wherein the discipline block indicates a field to which the tactile code relates to and the classification block and the plurality of data payload blocks indicate specific information pertaining to the notation represented by the tactile code.

4. The tactile code interpretation system as claimed in claim 1, wherein the tactile code interpretation system further comprises an auxiliary unit including one or more of:
  a swiping unit to swipe the acoustic code;
  a device interface to couple the tactile code device to a computing device; and
  a first transducer to provide the unique sound wave to the computing device.

5. The tactile code interpretation system as claimed in claim 1, wherein the tactile code interpretation system further comprises a base, wherein the plurality of the tactile units are removably attached to the base, fixedly attached to the base, or movably attached to the base.

6. The tactile code interpretation system as claimed in claim 1, wherein the tactile code device is a fob like structure including a plurality of polyhedron blocks, wherein the plurality of the polyhedron blocks combine to form a tactile surface of the fob like structure, the tactile surface functioning as a tactile unit.

7. The tactile code interpretation system as claimed in claim 1, wherein the tactile code device comprises:
  at least two gears;
  an actuator to actuate the at least two gears; and
  a conveyor belt unit adapted to be driven by the at least two gears, the conveyor belt unit comprising,
    an upper plate adapted to receive the plurality of tactile units, wherein a top surface of each of the tactile units includes the tactile code and a bottom surface of each of the tactile units includes the corresponding acoustic code;
    a lower plate including at least one pin to automatically swipe the acoustic code provided on the bottom surface of the tactile unit; and
    a conveyor belt adapted to be driven by the gears to impart motion to the lower plate, when triggered by the actuator.

8. A computer implemented method for providing a semantic interpretation of a notation represented by a tactile code provided on a tactile unit, from among a plurality of tactile units of a tactile code device, the method comprising:
  obtaining a binary data stream corresponding to a sound wave using digital signal processing techniques, the sound wave being generated, when an acoustic code provided on the tactile unit is swiped, wherein the acoustic code encodes information corresponding to a plurality of blocks, the plurality of blocks including a start block, an end block, and one or more information blocks;
  grouping by at least one computer processor bits in the binary data stream into a plurality of data segments to reform data encoded by the acoustic code, each data segment corresponding to a data block, from a plurality of data blocks, wherein the binary data stream is grouped based on code reformation data, the code reformation data including a length of each data block, predetermined start pattern and predetermined end pattern by:
    identifying a direction in which the acoustic code is swiped, based on the predetermined start pattern and the predetermined end pattern;
    shifting one or more bits in the binary data stream within a data segment, based on a position of the predetermined start pattern and the predetermined end pattern in the binary data stream;

segregating, based on the length of each data block, bits in the binary data stream to group the bits into the plurality of data segments; and calibrating for a speed of the swipe, based on spacing of individual peaks corresponding to codes within the start pattern stored in the code reformation data;

analyzing by at least one computer processor the plurality of data segments to determine the semantic interpretation of the notation, based on content data, wherein the content data includes data pertaining to notations represented by a plurality of tactile codes; and providing a trigger to generate an aural feedback providing the semantic interpretation of the notation, based on the analyzing.

9. The computer implemented method as claimed in claim 8, wherein the analyzing further comprises:

determining, from the reformed data, a composite key including one or more data segments corresponding to the one or more information blocks; and obtaining information regarding the notation represented by the tactile code from the content data, based on the composite key.

10. The computer implemented method as claimed in claim 8, wherein the method further comprises receiving inputs corresponding to configuration attributes indicative of preferences of a user, and wherein the aural feedback is provided based on the received inputs.

11. The computer implemented method as claimed in claim 8, wherein the method further comprises:

receiving, from a first transducer, an electrical signal corresponding to the sound wave generated when the acoustic code is swiped; and converting the electrical signal into the binary data stream using digital signal processing techniques.

12. A non-transitory computer readable medium having embodied thereon a computer program executable by at least one computer processor, for executing a method for interpreting a notation represented by a tactile code, the computer program which when executed by the at least one computer processor causes that at least one computer processor to perform the method comprising:

obtaining a binary data stream corresponding to a sound wave using digital signal processing techniques, the sound wave being generated, when an acoustic code provided on tactile unit is swiped, wherein the acoustic code encodes information corresponding to a plurality of blocks, the plurality of blocks including a start block, an end block, and one or more information blocks;

grouping bits in the binary data stream into a plurality of data segments to reform data encoded by the acoustic code, each data segment corresponding to a data block, from a plurality of data blocks, wherein the binary data stream is grouped based on code reformation data, the code reformation data including a length of each data block, predetermined start pattern and predetermined end pattern by:

identifying a direction in which the acoustic code is swiped, based on the predetermined start pattern and the predetermined end pattern;

shifting one or more bits in the binary data stream within a data segment, based on a position of the predetermined start pattern and the predetermined end pattern in the binary data stream;

segregating, based on the length of each data block, bits in the binary data stream to group the bits into the plurality of data segments; and calibrating for a speed of the swipe, based on spacing of individual peaks corresponding to codes within the start pattern stored in the code reformation data;

analyzing the plurality of data segments to determine a semantic interpretation of the notation, based on content data, wherein the content data includes data pertaining to notations represented by a plurality of tactile codes; and providing a trigger to generate an aural feedback providing the semantic interpretation of the notation, based on the analyzing.

13. The non-transitory computer readable medium as claimed in claim 12, wherein the analyzing further comprises:

determining, from the reformed data, a composite key including one or more data segments corresponding to the one or more information blocks; and obtaining information regarding the notation represented by the tactile code from the content data, based on the composite key.

14. The non-transitory computer readable medium as claimed in claim 12, wherein the method further comprises receiving inputs corresponding to configuration attributes indicative of preferences of a user, and wherein the aural feedback is provided based on the received inputs.

* * * * *